United States Patent Office 3,313,079
Patented Apr. 11, 1967

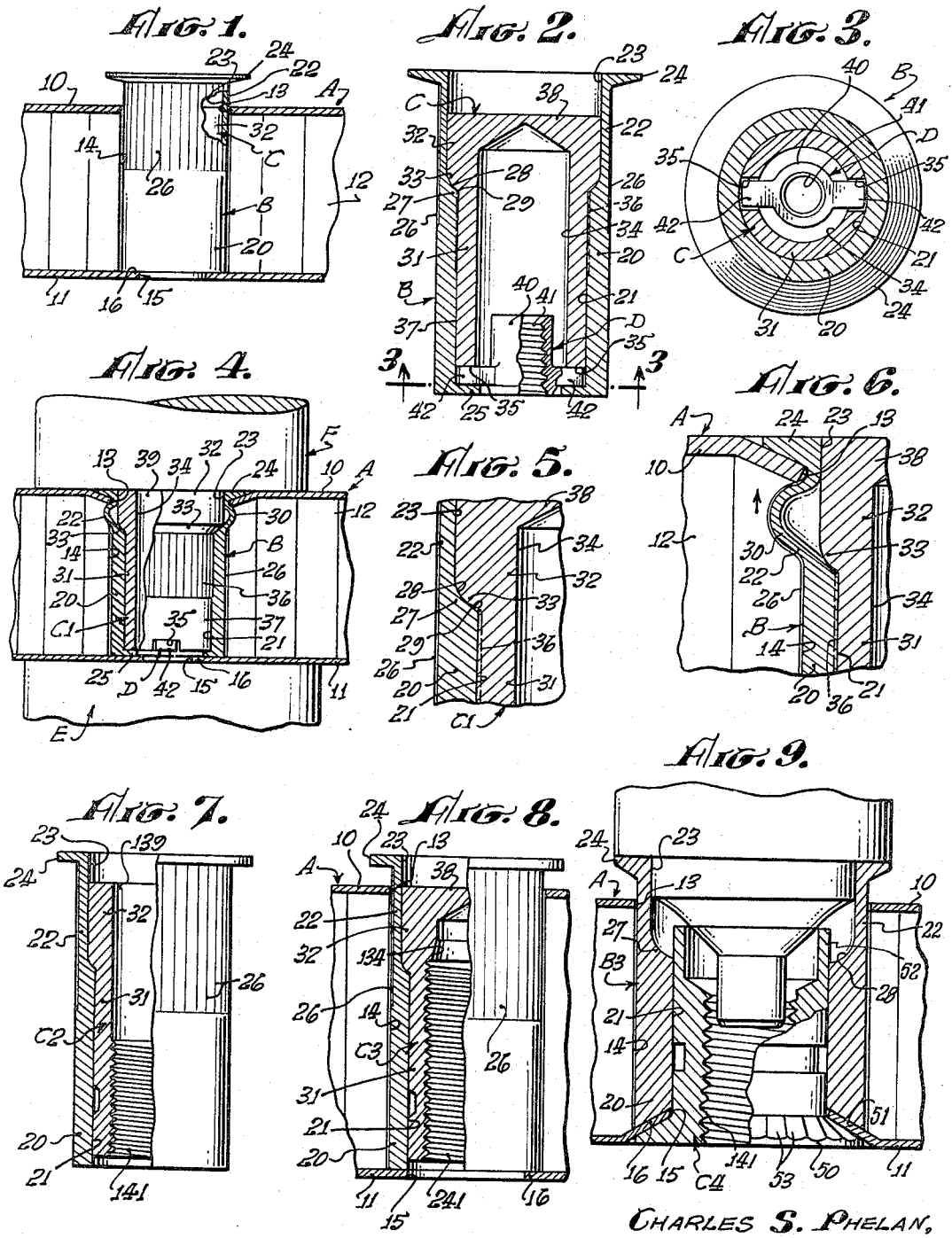

3,313,079
SANDWICH PANEL SPACER WITH TORQUE RESISTANT MECHANICAL ANCHORAGE
Charles S. Phelan, Tustin, Calif., assignor to
Frederick W. Rohe, Placentia, Calif.
Filed Mar. 29, 1965, Ser. No. 443,287
18 Claims. (Cl. 52—617)

This application is a continuation-in-part of the pending joint application of Frederick W. Rohe and Charles S. Phelan, Ser. No. 248,969 filed Jan. 2, 1963, now Patent No. 3,197,854 for Sandwich Panel Spacer With Torque-Resistant Mechanical Anchorage.

This invention relates to insert fasteners for installation in lightweight sandwich panels embodying spaced skins attached to opposite sides of a low density core.

The principal object of the invention is to provide a spacer type insert adapted to be securely anchored in a fragile, lightweight sandwich panel without requiring the use of an anchoring body of potting compound which is commonly employed in order to attain adequate anchorage of an insert in such a panel.

A further object is to provide such an insert, of a spacer type, embodying a nut that is floating, i.e. adapted for self-alignment with a threaded stud or a bolt when coupled to the fastener.

The invention aims to provide an insert having anchorage means of a mechanical type, with a clamping action, providing adequate anchorage by clamping against one of the skins of the panel. A further object is to provide an insert embodying a floating nut which is retained between the same two parts which cooperate with one another to develop the mechanical anchorage during installation.

Toward the attainment of the foregoing general objects, the invention provides a three-part spacer-type insert:

(1) Embodying a tubular shell and a plug telescoped therein in an assembly one end of which is adapted to abut against the inner face of one skin of a sandwich panel while the other end is clamped into anchorage engagement with the opposite skin;

(2) Wherein the opposite end of the shell is provided with a relatively thin, deformable sleeve portion terminating in an annular flange head for engagement with the outer face of a panel skin having a hole through which the insert is installed, and wherein compressive deformation of such sleeve portion provides a secondary head engaging such skin at its inner side to clamp the apertured margin thereof against said annular flange head;

(3) Wherein torque load-holding anchorage is attained by means of external knurling on the deformable sleeve, which is clamped into embedded engagement with the edge of the apertured skin to provide, in effect, a toothed interlocking connection;

(4) Wherein the relatively thin deformable sleeve portion of the shell is provided by a counterbore in the headed end thereof and wherein the plug is provided with a head of enlarged diameter snugly fitted within such counterbore and cooperating with the deformable sleeve in the formation of the secondary head in the shell by axial compression thereof;

(5) Wherein the plug has a length corresponding approximately to the depth of the sandwich panel and functions as a stop to limit the compressive deformation of the sleeve portion of the shell when the head thereof has been moved into the plane of the end of the plug head, whereby crushing of the panel during installation is prevented and it becomes possible to seat the head of the shell in substantially flush relation with the outer surface of the panel skin against which it is clamped;

(6) Wherein the thinned sleeve portion of the shell is joined to its thicker tubular body portion by means of an annular buttress section flaring gradually in thickness from the thickness of the sleeve portion to the thickness of the body portion of the shell and which, during the compressive deformation of the sleeve portion, directs the secondary head toward the head of the shell and against the inner edge of the panel skin to establish a good clamping engagement therewith;

(7) Embodying as a third part, a nut which is retained in the abutting end of the assembly, between the end of the plug and a radially inwardly projecting abutment seat on the adjoining end of the shell;

(8) Wherein the plug includes a tubular skirt portion defining a socket receiving the floating nut, and wherein the plug is provided with a plurality of relatively fine splines on its outer surface, adapted to become embedded in the inner wall of the shell body by installation of the plug under axial pressure into its telescoping assembly with the shell, thereby providing torque-load anchorage between the shell and the plug;

(9) Wherein the plug element of the fastener in one form of the invention is utilized to provide a socket for retaining the floating nut and, in a modified form of the invention, is internally threaded so as in itself to constitute a nut element.

Other objects and advantages will become apparent in the ensuing specification and appended drawing in which:

FIG. 1 is a sectional view of a sandwich panel and an elevational view of an insert embodying one form of my invention, in a preliminary stage of installation in the panel, with a portion thereof broken away and shown in section;

FIG. 2 is a detail sectional view of one embodiment of the insert assembly prior to installation;

FIG. 3 is a transverse sectional view taken on the line 3—3 of FIG. 2;

FIG. 4 is a transverse sectional view of a sandwich panel and the insert of FIG. 2 in a final stage of installation therein, and illustrating the method of installation, an inner portion of the insert assembly being shown partially in section and partially in elevation;

FIG. 5 is a fragmentary enlarged detail sectional view of a portion of the insert assembly prior to installation;

FIG. 6 is a fragmentary enlarged detailed sectional view of the insert as installed in a sandwich panel, illustrating the mechanical anchorage;

FIG. 7 is a view, partially in section and partially in elevation, of a modified form of the insert assembly which does not include the floating nut, the assembly being shown in the preliminary stage of installation;

FIG. 8 is a view of an insert assembly, partially in section and partially in elevation, generally similar to the insert assembly of FIG. 7 but slightly modified; and FIG. 9 is a view of a further modified form of the invention as embodied in a partially installed insert having mechanical anchorage at both ends thereof.

Referring now to the drawings in detail, and in particular to FIGS. 1 and 2, I have shown therein, as an example of one form in which the invention may be embodied, a spacer-insert adapted to be installed in a hole in a sandwich panel A, said insert comprising, in general, an outer shell B having a headed end which is deformable into clamping engagement with a skin defining one side of the panel A, a plug C disposed within the shell B and constituting a nut-receptacle, and a floating nut D which is mounted for floating action within the receptacle C and is axially confined by conjoint action of the plug C and the shell B.

The sandwich panel A is of conventional construction comprising opposite skin sheets 10 and 11 and a low-density core 12 which, in accordance with the most common practice, may be of honeycomb cellular construction. In preparation for the installation of the spacer-insert B–C, the panel is distilled to provide an opening 13 in the skin 10 the opening 13 being continued into a hole 14 extending through the core 12 to the opposite skin 11. Where the drill intersects the edges of the honeycomb walls of core 12, the diameter is the same as that of the opening 13. A smaller aperture 15, coaxial with the aperture 13, is drilled in the opposite skin 11, leaving an annular marginal portion 16 of skin 11 protruding inwardly from the diameter of hole 14.

The shell B is of a cylindrical tubular form having a reltaively thick-walled body 20 provided with a cylindrical bore 21, and a relatively thin walled deformable sleeve 22 of the same outer diameter as the main body portion 20 and defined internally by a counterbore 23. Sleeve 22 has a head 24 of radial flange form on its outer end, for clamping engagement against the outer surface of skin 10. At the end of body 20 is an integral thin, flat radial annular lip 25 of flange form projecting inwardly and providing an abutment seat. This end of the shell B is adapted to seat flatly against the inner surface of the inwardly projecting marginal portion 16 of skin 11 as shown in FIGS. 1 and 4. The outer surface of deformable sleeve portion 22 is provided with knurling 26 which, as shown, is preferably in the form of relatively minute longitudinally extending flutes presenting sharp edges for embedding engagement with the inner surface of skin 10. Knurling of other designs (e.g. pointed diamond type) can be utilized, though less satisfactory.

Referring now to the enlarged detail showing in FIG. 5, the deformable sleeve portion 22 is joined to the main body portion 20 by an annular buttress portion 27 which is defined internally by a broadly curved fillet 28 and terminates in a shoulder 29. The buttress portion 27 thus is gradually increased in thickness toward the shoulder 29. This is a very important feature in providing a deformed secondary head 30 (FIG. 4) in the form of an annular bulb, which, because of the buttressing effect of the buttress portion 27, is directed toward the head 24 during the deformation, and is pushed into clamping engagement with the inner surface of the skin 10 beneath the head 24, with the knurling 26 impressed into skin 10 to establish a toothed coupling providing a good torque-resisting anchorage.

Plug C comprises a main body portion 31 of cylindrical tubular form and a head portion 32 of enlarged outer diameter, an annular shoulder 33 being defined at the junction between the two portions. A bore 34 extends through the body portion 31 into the head 32, from an open end of the plug (remote from the head 32) which is provided with diametrically opposed key notches 35 for holding the nut D against rotation. The open end of plug C is abutted against the end lip 25 of shell B. The shoulder 33 of plug C is in adjacent, opposed relation to shoulder 29 of shell B and may be actually seated thereagainst, though not necessarily so. The outer surface of main body portion 31 is provided with fine splines 36 extending from the shoulder 33 a substantial distance toward the open end of plug C, leaving a substantial portion of the length of the plug unsplined. The splines 36 are of fine cross sectional dimension and may be formed by substantially the same knurling process as the knurling 26 of the shell B. The unsplined end portion 37 of body 31 is of very slightly smaller diameter than the bore 21 of sleeve 22, so as to facilitate insertion of the plug C into the shell B during initial assembly of the parts, but the outer diameter of the splines 36 is slightly larger than the bore 21, requiring heavy pressure to force the splined portion of the plug into the sleeve body 20. This provides a splined connection between the plug C and sleeve 22, resulting from embedment of the splines 36 into the wall of sleeve body 20 during assembly, thus locking the two parts together with a good torque-transmitting coupling.

Plug C may be of cup shape, having a closed end 38 in its head 32 as shown in FIG. 2, for blind reception of the threaded end of a bolt or threaded stud; or it may have a through bore 39 for reception of a through bolt, as indicated in FIG. 4. With the exception of this modification of the bore in the plug C1 of FIG. 4, this form of the invention is identical to the form shown in FIGS. 1–3. The structural features illustrated particularly in FIG. 4 are also embodied in each instance in the structures shown in FIGS. 1–3, and the installation is the same in each instance.

All features described above, as embodied in the panel A, shell B and plug C are also embodied in the modified forms of the invention shown in FIGS. 7 and 8, with the exception of the lip 25 and of the floating nut D, the inserts of FIGS. 7 and 8 being provided with integral threads 141 and 241 respectively in the plugs C2 and C3 of FIGS. 7 and 8, the plug C2 of FIG. 7 having a through bore 139, as in FIG. 4, and the plug C3 of FIG. 8 having a blind bore 134 and a closed head 38, as in FIG. 2.

FIG. 9 discloses a further modified form of the invention, wherein my improved buttress 27 and the associated parts which provide the improved clamping of skin 10 between the secondary head 30 and the flange head 24, is embodied in a fastener disclosed in the aforesaid application Ser. No. 248,969. In that fastener a plug C4 extends through the somewhat larger opening 15 of skin 11 and has a flange head 50 on its outer end which clamps the aperture marginal portion of skin 11 against a shoulder 51 on the opposed end of shell B3 in an intermediate stage of installation which takes place prior to the formation of the upset head 30 from thinned sleeve 22 of the shell. The formation of the upset head 30 and the associated parts 20, 22, 23, 24, 27, 28 and 29 is the same as in FIGS. 1–8, but a flanged head is swaged against shoulder 31 from a thinned tip 52, instead of a preformed head 32. The shoulder 51 may be countersunk as shown, and the head 50 may be of a corresponding countersunk type adapted to dimple the skin 11. Also, head 50 may have radial flutes 53 for torque-anchorage against the skin 11. The plug C4 may be provided with integral threads 141 as in FIG. 7. This insert-spacer is described more fully in the aforesaid application Ser. No. 248,969.

After installation, the insert becomes operative to anchor the threaded end of a stud or bolt inserted through the aperture 15 of skin 11 and threaded into the floating nut D of FIGS. 1–4 or into the threads 141 or 241 of plug C2 or plug C3. Where a bolt is employed to secure another part to the panel A, and is tightened so as to apply a strong pull against the nut or plug of the fastener, the load (in FIGS. 7 and 8) will be transferred from the shoulder 33 of plug head 22 to the shoulder 29 of the shell and from the abutting end of the shell directly to the projecting annular portion 16 of skin 11, thence back to the part that is secured by the bolt. Thus there is no possibility of the fastener being pulled out of the panel. In FIGS. 1–4, the load on the nut will be applied directly to the abutment lip 25 of the shell and thence to skin portion 16. In each instance, the engagement of flange head 24 against skin 10 provides additional axial load sustaining anchorage, and the clamping of skin 10 between heads 24 and 30 provides torque load-holding anchorage.

Nut D per se is of conventional floating-nut construction, comprising an internally threaded tubular nut body 40, internally threaded at 41, and integral keys 42 projecting from one end thereof in diametrically opposite positions. Keys 42 are received in the notches 35 and are confined between the plug C and the end lip 25 of sleeve 22 as best shown in FIG. 3. The keys 42 terminate short of the diameter of sleeve bore 21, so as to provide radial float of the nut D along its diameter intersecting the keys 42. The keys 42 (FIG. 4) are narrower than the notches 35 circumferentially, so as to provide radial float transversely of said diameter. The keys 42 are thinner (parallel to the nut axis) than the depth of notches 35, so as to be loosely contained in the notches, free of any clamping engagement between the plug C and the lip 25.

The installation of my improved fastener, in each of its disclosed forms, is quite simple. The panel A is rested upon a suitable anvil E or other solid, rigid supporting surface providing adequate support. The insert assembly (e.g. disclosed in any one of FIGS. 2, 7 and 8) is dropped into the hole 14 in the panel A as illustrated in FIG. 1, with the end surface of plug head 38 (or the corresponding end of the plug C1 or the plug C2) positioned substantially flush with the skin 10, as shown in FIG. 1. A ram F (FIG. 4) having a flat, square end face (e.g., the ram of an arbor press having the anvil E as its bed) is then brought into engagement with the end face of shell head 24 and the shell is then subjected to compression until the head 24 is moved into seating engagement with the skin 10. Where the head 24 is of the countersunk type, the parts of the fastener are proportioned so that a dimple is formed in the skin 10, thus seating the outer face of head 24 in flush relation to the outer face of skin 10. At this point, the ram F will establish solid contact with the head 32 of the plug, and since the opposite end of the plug is seated solidly upon the abutment lip 25 which in turn is seated on the annular projecting portion 16 of skin 11, solidly supported by the upper face of anvil E, the further downward movement of ram F will be effectively arrested without applying any crushing pressure to the skin 10.

During this compressive operation, the thin-walled sleeve 22 of the shell will be upset or buckled with a bulbing action which is directed outwardly (the snugly fitting lateral surface of head 32 preventing inward buckling) and the buttress section 27 of the shell will direct the bulbed head 30 toward the head 24 as indicated by the arrow in FIG. 6, thus seating the knurling or splines 26 in embedded engagement with the edge of the skin 10 defining the aperture 13, and clamping the margin of the skin tightly between the head 30 and the head 24.

I claim:

1. A spacer type insert fastener for installation in a lightweight sandwich panel embodying spaced skins attached to opposite sides of a low-density core, having a hole extending through one of said skins and through said core, and having in the other skin an opening coaxial with and of smaller diameter than said hole, defined by an annular portion of said other skin constituting a bottom for said hole, said fastener comprising, in combination: a shell including at one end a tubular body having an end provided with inwardly projecting means defining an abutment seat, and including at its other end a thin compression-deformable sleeve having an open end provided with an outwardly projecting annular flange head for seating against said one skin; a plug received in said shell, said plug including a skirt defining a nut receptacle and having an open end abutting said seat and provided with a key notch, and an opposite end initially located below said head within said open end of the shell; and a nut disposed within said skirt and having a radially projecting key loosely retained in said notch between said seat and the abutting end of said plug, thereby mounting said nut in a floating captive condition; said shell being receivable in said hole with said end of the tubular body abutted against said hole bottom and with the sleeve projecting beyond said one skin so as to provide for the formation of an annular bulbed secondary head in said sleeve beneath said one skin and operable to secure the same against said flange head by compression of said shell axially until it is reduced to a length substantially equal to the thickness of said panel, support being transmitted from a supporting surface directly through said other skin to the abutting end of said shell during such compression.

2. An insert fastener as defined in claim 1, wherein said shell has a knurled external surface adjoining said flange head, said knurled surface providing a torque load-holding connection between said secondary head and the inner surface of said one skin sheet when said secondary head is formed.

3. An insert fastener as defined in claim 2, wherein said sleeve is of considerably less thickness than said tubular shell body and is joined thereto by an annular buttress portion having a toroidally-curved internal shoulder wall and a gradual increase in thickness toward said body, such as to direct said secondary head into gripping engagement with said one skin as said secondary head is formed under compression.

4. An insert fastener as defined in claim 1, wherein said shell is formed with fine flutes in its external surface adjacent said flange head, said flutes having edges which become embedded in the inner surface of said one skin upon formation of said secondary head, so as to provide a torque load-holding connection between said one skin and said shell.

5. A spacer type insert fastener for installation in a lightweight sandwich panel embodying spaced skins attached to opposite sides of a low-density core, having a hole extending through one of said skins and through said core, and having in the other skin an opening coaxial with and of smaller diameter than said hole, defined by an annular portion of said other skin constituting an apertured bottom for said hole, said fastener comprising, in combination: a shell including at one end a relatively thick-walled tubular body defining a bore, said body having an end provided with an internal thin, flat annual radial lip partially closing an end of said bore, and said shell including at its other end a relatively thin, compression-deformable sleeve having an open end provided with an external radial flange head for seating against said one skin, said sleeve defining a counterbore; a plug including a skirt fitted in said bore and an enlarged head fitted in said counterbore, said skirt defining a nut receptacle and having an open end abutting said radial lip and provided with a key notch; and a nut disposed within said skirt and having a radially projecting key loosely retained in said notch between said lip and the abutting end of the plug and mounting said nut in a floating captive condition; said shell being receivable in said hole with said end of the tubular body abutted against said hole bottom and with the sleeve projecting beyond said one skin so as to provide for the formation of an annular bulbed secondary head in said sleeve beneath said one skin and adapted to secure the same against said flange head by compression of said shell axially to bring said flange head into engagement with said one skin, said plug head initially directing the bulbing of said secondary head outwardly.

6. An insert fastener as defined in claim 5 wherein said skirt and nut have mating pairs of said keys and notches in diametrically opposed positions.

7. A spacer type insert fastener for installation in a lightweight sandwich panel embodying spaced skins attached to opposite sides of a low-density core, having a hole extending through one of said skins and through said core, and having in the other skin an opening coaxial with and of smaller diameter than said hole, defined by an annular portion of said other skin constituting an apertured bottom for said hole, said fastener comprising, in combination: a shell including at one end a relatively thick-walled tubular body defining a bore, and at its other end a relatively thin, compression-deformable sleeve having an open end provided with an external radial flange head for seating against said one skin, said sleeve defining a counterbore beginning with an annular integral shoulder at the end of said thick-walled tubular body and extending to said open end; a plug including a skirt fitted in said bore and an enlarged head fitted in said counterbore; said shell being receivable in said hole with said end of the tubular body abutted against said hole bottom and with the sleeve projecting beyond said one skin so as to provide for the formation of an annular bulbed secondary head in said sleeve beneath said one skin and adapted to secure the same against said flange head by compression of said shell axially to bring said flange head into engagement with said one skin, said plug head filling said counterbore from said annular internal shoulder to the plane of said one skin when said tubular body is abutted against said hole bottom, and initially directing the bulbing of said secondary head outwardly.

8. An insert fastener as defined in claim 7, wherein said plug has a torque load-holding press-fitted connection in said shell body.

9. An insert fastener as defined in claim 8, wherein said plug has in its outer surface, adjacent its head, a plurality of fine flutes embedded in the inner surface of said shell body to provide said torque load-holding connection.

10. An insert fastener as defined in claim 7, said annular shoulder defining, at the end of said thick-walled tubular body, a buttress section of gradually decreasing radial thickness from said shoulder to said sleeve and having a concavely curved toroidal inner surface merging with and tangent to the inner surface of said sleeve, for directing the bulbing of said sleeve toward said flange head.

11. A spacer-type insert fastener for installation in a lightweight sandwich panel embodying spaced skins attached to opposite sides of a low-density core, having a hole extending through one of said skins and through said core, and having in the other skin an opening coaxial with and of smaller diameter than said hole, defined by an annular portion of said other skin constituting a bottom for said hole, said fastener comprising, in combination: a pair of telescoped tubular fastener parts one of which is an outer shell having an end provided with inwardly projecting nut seat means and the other of which is a plug press-fitted in said shell so as to secure said plug and shell together and to provide a torque load-holding connection therebetween; said plug including a skirt defining a nut receptacle and having an open end abutting said nut seat and provided with a key notch, one of said fastener parts having an opposite end provided with an outwardly projecting annular flange head for seating against said one skin; and a nut disposed within said skirt and having a radially projecting key loosely retained in said notch between said nut seat and the abutting end of said plug, thereby mounting said nut in a floating captive condition; said shell being receivable in said hole with its said end abutted against said hole bottom and having integral means engageable beneath said one skin for securing the same against said flange head so as to anchor said fastener in said panel.

12. A fastener as defined in claim 11, said plug having in its outer surface, adjacent its head, a plurality of fine flutes embedded in the inner surface of said shell body to provide said torque load-holding connection.

13. An insert for installation in a lightweight sandwich panel embodying skins secured to opposite sides of a low-density core and having a hole therein beginning with an opening in one of said skins, extending through said core and having a bottom defined by the other skin, said insert comprising, in combination: a tubular shell having at one end a relatively thick-walled tubular body defining a bore, and at its other end a relatively thin, compression-deformable sleeve having an open end provided with an external radial annular flange head for seating against said one skin, said sleeve defining a counterbore beginning with an annular internal shoulder at the end of said thick-walled tubular body and extending to said open end, said deformable sleeve adapted, when compressed axially, to be upset to provide an outwardly bulbed secondary head of toroidal bead form for engaging the inner side of said one skin while said flange head engages the outer side of said one skin, and a circumferentially-continuous succession of fine axially extending flutes in the outer surface of said sleeve portion adapted to become embedded in the margin of said one skin defining said opening, for torque anchorage; a plug within said shell, initially of shorter length than said shell and providing a means to limit compression of said shell at a length where said flange head is seated against said one skin, said plug including a skirt fitted in said bore, said skirt defining a nut receptacle and having an open end provided with a key notch, and an enlarged head fitted in said counterbore, filling the same from said annular internal shoulder to the plane of said one skin when said secondary head is formed, and initially directing the bulbing of said secondary head outwardly; and a nut disposed within said skirt and having a radially projecting key loosely received in said notch between the end of said plug and said hole bottom in floating, non-rotatable relation to said plug.

14. An insert for installation in a lightweight sandwich panel embodying skins secured to opposite sides of a low-density core and having a hole therein beginning with an opening in one of said skins, extending through said core and having a bottom defined by the other skin, said insert comprising, in combination: a tubular shell having at one end an annular flange head and a relatively thin, deformable sleeve adapted, when compressed axially, to be upset to provide an outwardly bulbed secondary head of toroidal bead form for engaging the inner side of said one skin while said flange head engages the outer side of said one skin; a circumferentially-continuous succession of fine axially extending flutes in the outer surface of said sleeve portion adapted to become embedded in the margin of said one skin defining said opening, for torque anchorage; and a plug within said shell, initially of shorter length than said shell and providing a means to limit compression of said shell at a length where said flange head is seated against said one skin.

15. An insert as defined in claim 14, wherein said plug has an enlarged head disposed within said sleeve portion of the shell and supporting the same internally during the upsetting formation of said secondary head, said plug head having an axial length substantially equal to the aggregate length of the two head portions of said shell when said secondary head is formed.

16. An insert as defined in claim 15, wherein said plug head and said shell have respective annular shoulders interengageable to direct the outward bulbing of said secondary head, and wherein said shell has a toroidally-curved annular shoulder at the base of said sleeve, defining an annular buttress portion of gradually decreasing thickness beginning with its respective shoulder and merging with said sleeve portion and operable to direct said secondary head toward said one skin during said upsetting.

17. A spacer type insert fastener for installation in a lightweight sandwich panel embodying spaced skins attached to opposite sides of a low-density core, having a hole extending through one of said skins and through said core, and having in the other skin an opening coaxial with and of smaller diameter than said hole, defined by an annular portion of said other skin constituting a bottom for said hole, said fastener comprising, in combination: a tubular shell and a plug within said shell, said shell having means for securing one end thereof to the margin of said one skin defining the mouth of said hole, and having its other end adapted to abut said hole bottom and provided with radially inwardly projecting nut seat means, said plug including a skirt having a corresponding end adapted to rest on said nut seat and provided with an end-opening notch; and a nut disposed within said skirt and having a radially projecting key loosely retained in said notch between said nut seat and the abutting end of said plug, thereby mounting said nut in a floating captive condition.

18. An insert for installation in a lightweight sandwich panel embodying skins secured to opposite sides of a low-density core and having a hole therein beginning with an opening in one of said skins, extending through said core and terminating adjacent the plane of the other skin, said insert comprising, in combination: a tubular insert shell having at one end a relatively thick-walled body defining a bore and having at its other end an annular flange head and a relatively thin, deformable sleeve defining a counterbore extending through said flange head and adapted, when compressed axially, to be upset to provide an outwardly bulbed secondary head of toroidal bead form for engaging the inner side of said one skin while said flange head engages the outer side of said one skin; said sleeve being of considerably less thickness than said tubular shell body and being joined thereto by an annular buttress portion having a toroidally-curved internal shoulder wall and a gradual increase in thickness toward said body, such as to direct said secondary head into gripping engagement with said one skin as said secondary head is formed under compression applied against the respective ends of said shell, said body having at its end a radial lip partially closing the end of said bore; a plug including a skirt fitted in said bore and an enlarged head fitted in said counterbore, said skirt defining a nut receptacle and having an open end abutting said radial lip and provided with a key notch; and a nut disposed within said skirt and having a radially projecting key loosely retained in said notch between said lip and the abutting end of the plug and mounting said nut in a floating captive condition, said plug head substantially filling said counterbore when said secondary head is formed.

References Cited by the Examiner

UNITED STATES PATENTS

| | | | |
|---|---|---|---|
| 2,409,352 | 10/1946 | Gill | 85—70 |
| 2,670,021 | 2/1954 | Torresen et al. | 85—70 |
| 2,763,314 | 9/1956 | Gill | 85—70 |
| 3,001,252 | 9/1961 | Erickson et al. | 52—617 |
| 3,042,156 | 7/1962 | Rohe | 16—2 |
| 3,197,854 | 8/1965 | Rohe et al. | 85—69 X |

FOREIGN PATENTS 590,054  1/1960  Canada.

FRANK L. ABBOTT, *Primary Examiner.*

A. C. PERHAM, L. R. RADANOVIC,
*Assistant Examiners.*